United States Patent
Han et al.

(10) Patent No.: US 10,444,993 B2
(45) Date of Patent: Oct. 15, 2019

(54) METHOD AND DEVICE FOR SELECTING RAID LEVEL FOR MAPPED RAID

(71) Applicant: EMC IP Holding Company LLC, Hopkinton, MA (US)

(72) Inventors: Geng Han, Beijing (CN); Hongpo Gao, Beijing (CN); Jibing Dong, Beijing (CN); Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 15/628,738

(22) Filed: Jun. 21, 2017

(65) Prior Publication Data

US 2017/0364271 A1    Dec. 21, 2017

(30) Foreign Application Priority Data

Jun. 21, 2016 (CN) .......................... 2016 1 0454286

(51) Int. Cl.
*G06F 11/00*   (2006.01)
*G06F 3/06*   (2006.01)
*G06F 11/10*   (2006.01)

(52) U.S. Cl.
CPC .......... *G06F 3/0604* (2013.01); *G06F 3/0619* (2013.01); *G06F 11/1076* (2013.01); *G06F 11/1092* (2013.01); *G06F 11/1096* (2013.01); *G06F 3/0631* (2013.01); *G06F 2211/1028* (2013.01)

(58) Field of Classification Search
CPC .... G06F 3/0604; G06F 3/0619; G06F 3/0631; G06F 3/0689; G06F 11/1092; G06F 11/1076; G06F 2211/1028
See application file for complete search history.

(56) References Cited

U.S. PATENT DOCUMENTS 9,641,615 B1 *   5/2017   Robins ................ H04L 67/1097
2018/0246668 A1 *   8/2018   Sakashita .............. G06F 3/0604

* cited by examiner

*Primary Examiner* — Philip Guyton
(74) *Attorney, Agent, or Firm* — BainwoodHuang

(57) ABSTRACT

A method and device for selecting a Redundant Array of Independent Disks (RAID) level for mapped RAID. The method comprises determining, for a given RAID level, a desired ratio of rebuilding speed between the mapped RAID and non-mapped RAID based on the first number of disks in the non-mapped RAID and the second number of disks in the mapped RAID. The method also comprises determining an actual ratio of rebuilding speed between the mapped RAID and the non-mapped RAID based on the second number of disks in the mapped RAID. In addition, the method comprises selecting the given RAID level for the mapped. RAID in response to the actual ratio being above the desired ratio.

15 Claims, 8 Drawing Sheets

US 10,444,993 B2

METHOD AND DEVICE FOR SELECTING RAID LEVEL FOR MAPPED RAID

RELATED APPLICATIONS

This application claim priority from Chinese Patent Application Number CN201610454286.X, filed on Jun. 21, 2016 at the State Intellectual Property Office, China, titled "METHOD AND APPARATUS FOR SELECTING RAID LEVEL FOR MAPPED RAID" the contents of which is herein incorporated by reference in its entirety.

FIELD

Embodiments of the present disclosure generally relate to the field of storage technology, and more specifically, to a method and device for selecting a RAID level for mapped RAID.

BACKGROUND

Redundant Array of Independent Disks (RAID) is a data backup technology, which can combine a plurality of independent physical disks in different manners to form a disk array (that is logical disks) so as to provide a better storage performance and higher reliability than a single disk. In order to restore data when a certain disk in the RAID fails, the RAID is typically provided with one parity check information block (such as RAID 1, RAID 3, RAID 5 or the like) or two or more parity check information blocks (such as RAID 6) and so forth.

Taking RAID 5 as an example, if a certain disk in the RAID fails, a new disk is added to the RAID. Then, the RAID can calculate the data in the failed disk by use of distribution check information, and rebuild the data in the new disk to restore the data. However, in the process of rebuilding the failed disk, if a further disk also fails, data loss in the RAID will be caused, thereby decreasing the reliability of the RAID.

SUMMARY

Embodiments of the present disclosure provide a method and device for selecting a RAID level for mapped RAID. Embodiments of the present disclosure can effectively evaluate the reliability of the mapped RAID by comparing a desired ratio and an actual ratio of rebuilding speed between the mapped RAID and the non-mapped RAID. Accordingly embodiments of the present disclosure can select an appropriate RAID level for the mapped RAID from the perspective of reliability.

According to one aspect of the present disclosure, a method for selecting a RAID level, for mapped RAID is provided. The method comprises determining, for a given RAID level, a desired ratio of rebuilding speed between the mapped RAID and non-mapped RAID based on the first number of disks in the non-mapped RAID and the second number of disks in the mapped RAID. The method also comprises determining an actual ratio of rebuilding speed between the mapped RAID and the non-mapped RAID based on the second number of disks in the mapped RAID. In addition, the method comprises selecting the given RAID level for the mapped RAID in response to the actual ratio being above the desired ratio.

According to another aspect of the present disclosure, an electronic device is provided. The electronic device comprises a memory and a processing unit that is coupled to the memory and configured to determine, for a given Redundant Array of Independent Disks (RAID) level, a desired ratio of rebuilding speed between mapped RAID and non-mapped RAID based on the first number of disks in the non-mapped RAID and the second number of disks in the mapped RAID. The processing unit is also configured to determine an actual ratio of rebuilding speed between the mapped RAID and the non-mapped RAID based on the second number of disks in the mapped RAID; and select the given RAID level for the mapped RAID in response to the actual ratio being above the desired ratio.

According to a further aspect of the present disclosure, a computer program product is provided. The computer program product is tangibly stored on a non-transient computer readable medium and comprises machine-executable instructions. The machine-executable instructions, when executed, cause a machine to perform steps of the method according to embodiments of the present disclosure.

The Summary is to introduce a selection of concepts in a simplified form that are further described below in the Detailed Description. This Summary is not intended to identify key features or essential features of the present disclosure, nor is it, intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. The similar reference sign always represents the similar component in example embodiments of the present disclosure.

DETAILED DESCRIPTION OF EMBODIMENTS

The preferred embodiments of the present disclosure will be described below in more detail with reference to the drawings. Though the drawings illustrate preferred embodiments of the present disclosure, it would be appreciated that the present disclosure may be implemented in various manners but should not be restricted by the embodiments illustrated herein. Instead, theses embodiments are provided to make the present disclosure more thorough and complete, and to convey the scope of the present disclosure exactly to those skilled in the art.

As used herein, the term "include" and its variants are to be read as open-ended terms that mean "include, but is not limited to." The term "or" is to be read as "and/or" unless the context clearly denotes otherwise. The term "based on" is to be read as "based at least in part on." The term "one example embodiment" and "an embodiment" are to be read as "at least one example embodiment." The term "another embodiment" is to be read as "at least another embodiment". The terms "first", "second", and so on, may indicate different or identical objects. Other explicit and implicit definitions may be included below.

In embodiments of the present disclosure, the term "mapped RAID" refers to the RAID that, can use a plurality of disks in the RAID to rebuild a failed disk in parallel, and the term "non-mapped RAID" refers to the traditional RAID that use a single disk to rebuild the failed disk. In embodiments of the present disclosure, the term "disk" refers to a non-volatile memory for permanently storing data. Examples of disk include, but are not limited to, a hard disk drive (HDD), CD-ROM drive, solid state disk (SSD), and so on.

Take RAID 5 as an example, in the traditional non-mapped RAID, the RAID 5 generally includes 5 disks. The RAID 5 consists of block-level stripes having distributed check information which may be distributed across a plurality of disks, each stripe may include 5 blocks, that is 4 data blocks and 1 parity check information block (simply referred to as "4D+1P"). If one disk in the RAID fails, the following read can be calculated from the distributed check information, such that the data can be restored and will not be lost. Meanwhile, a hot spare disk will be selected to replace the failed disk, and all data on the failed disk will be rebuilt and written onto the hot spare disk. However, since only one hot spare disk participates in the process of RAID rebuilding and the time for RAID rebuilding is dependent on a write bandwidth of the hot spare disk, the rebuilding time of the failed disk is usually very long in the traditional non-mapped RAID.

Figure 1:
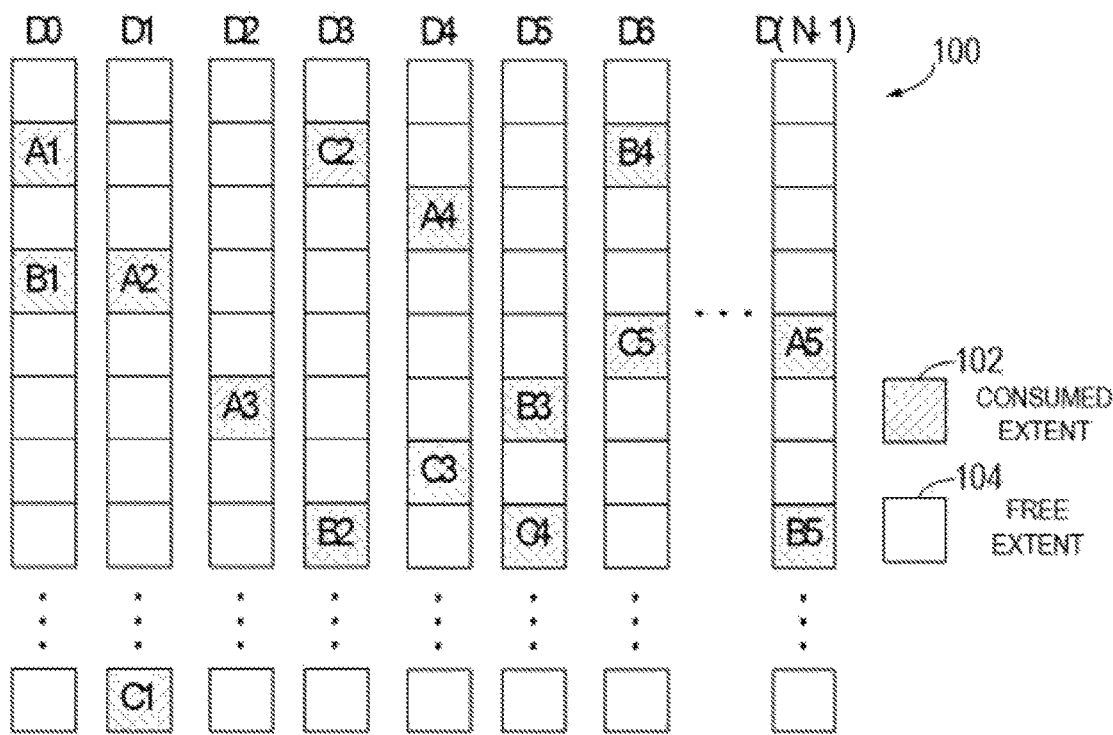
FIG. 1 is a diagram illustrating an example layout of mapped RAID according to embodiments of the present disclosure.

FIG. 1 is a diagram illustrating an example layout 100 of mapped RAID according to embodiments of the present disclosure, which illustrates an example of using RAID 5 of "4D+1P" or N disks, and N is greater than 5. The mapped RAID may be formed of more disks than the traditional RAID, and each disk may be regarded as a set of continuous, non-overlapping, size-fixed extents (also referred to as "disk extents"). As shown in FIG. 1, the mapped RAID includes N disks, respectively represented as disks D0, D1, D2, D3 . . . D(N−1). In the mapped RAID as shown in FIG. 1, extents A1, A2, A3, A4 and A5 form a stripe for storing data, and A1-A4 may be data blocks while A5 may be a parity check information block. Besides, extents B1, B2, B3, B4 and B5 form another stripe, and extents C1, C2, C3, C4 and C5 form a further stripe.

As shown in FIG. 1, if a RAID stripe needs to be created, 5 extents may be randomly selected from 5 different disks. Therefore, data and check information are finally distributed into consumed disk extents (as shown by a pattern 102 in FIG. 1) in all disks. In addition, some extents may be reserved on each disk as hot spare extents (as shown by a pattern 104 in FIG. 1), rather than the whole disk being reserved as the hot spare disk in the traditional RAID 5. If one disk fails in the mapped RAID, an extent on another disk may be randomly selected as a replacement for each extent on the failed disk.

Figure 2:
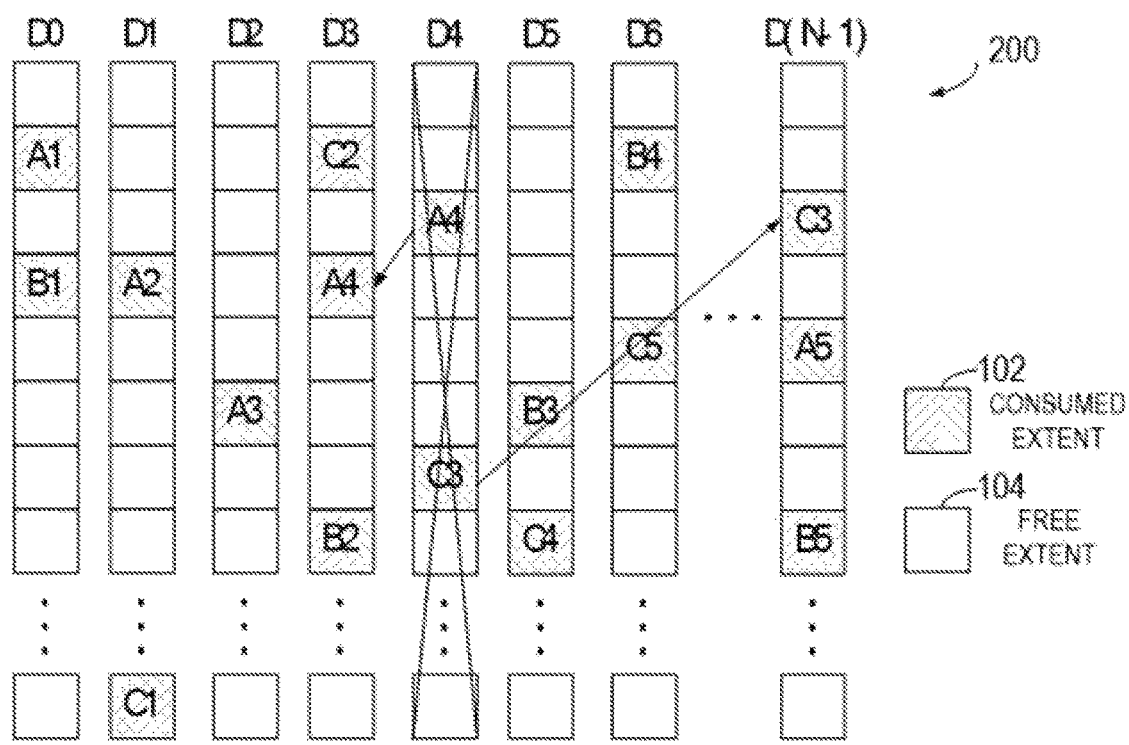
FIG. 2 is a diagram illustrating an example layout of mapped RAID after rebuilding the failed disk according to embodiments of the present disclosure.

FIG. 2 is a diagram illustrating an example layout 200 of the mapped RAID after rebuilding the failed disk according to embodiments of the present disclosure. As shown in FIG. 2, after the disk D4 fails, a hot spare extent (as represented by 104 in FIG. 2) on other disks may be randomly selected for each consumed extent (as represented by 102 in FIG. 2, for example extents A4 and C3) on the disk D4. For example, the extent A4 is rebuilt and written into one spare extent in the disk D3, while the extent C3 is rebuilt and written into one spare extent in D(N−1). A restriction on extent selection is to ensure all the time that each RAID stripe should be distributed across 5 different disks. Therefore, by means of the mapped RAID technology, multiple or even all disks in the RAID may be applied to rebuild the failed disk. Moreover, since there is no single hot spare disk and rebuilding and writing of a plurality of extents can be performed in parallel, the RAID rebuilding speed is greatly increased.

Generally, if there are more disks in the mapped RAID, the RAID rebuilding speed is faster. However, an increase of the number of disks in the RAID will cause an increasing failure rate of the whole RAID. Therefore, extending the traditional RAID to the mapped RAID, which will increase the number of disks, may affect its reliability. In the mapped RAID, each stripe is randomly formed of extents in a plurality of disks, and there is no technology or model for evaluating reliability of the mapped RAID in the prior art. Conventionally, the reliability of the mapped RAID cannot be evaluated, such that an appropriate RAID level cannot be selected accurately for the mapped RAID.

Embodiments of the present disclosure provide a method and device for selecting a RAID level for the RAID. Embodiments of the present disclosure can effectively evaluate the reliability of the mapped RAID by comparing a desire ratio and all actual ratio of rebuilding speed between the mapped RAID and, the non-mapped RAID. Accordingly, embodiments of the present disclosure can select an appropriate RAID level for the mapped RAID from the perspective of reliability. In addition, embodiments of the present disclosure can determine data loss rates of the mapped RAID and the non-mapped RAID respectively. Furthermore, embodiments of the present disclosure can determine, for various RAID levels, an appropriate number of disks in the mapped RAID in the case of ensuring the reliability of the mapped RAID.

Figure 3:
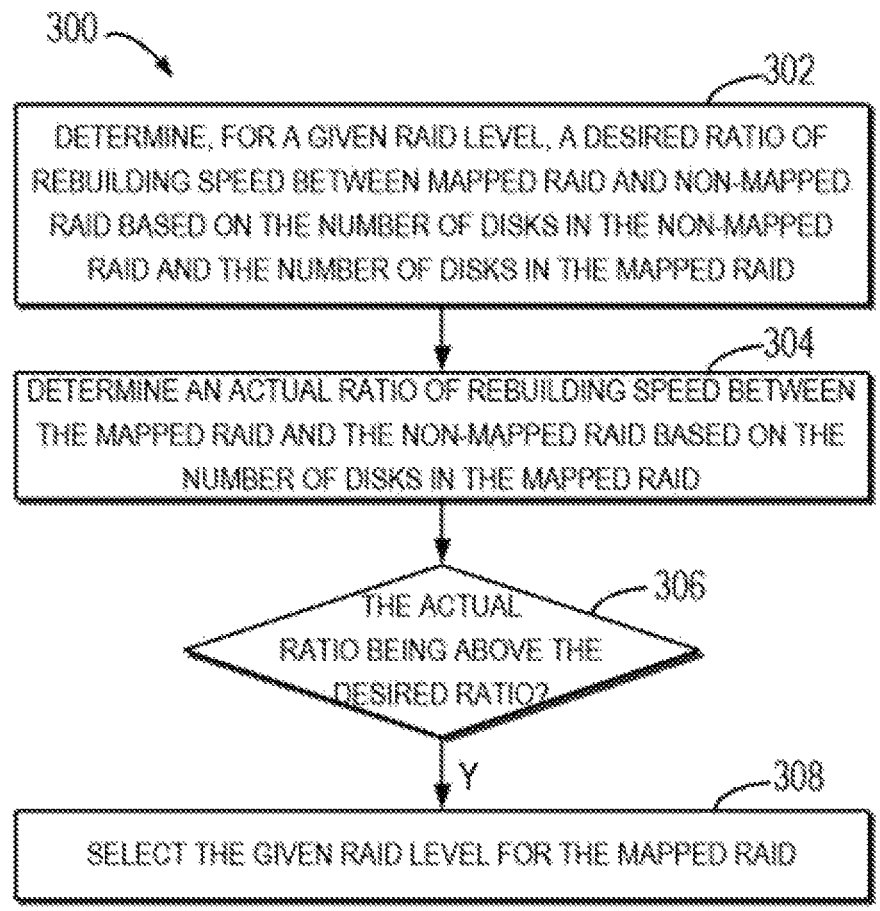
FIG. 3 is a flowchart illustrating a method for selecting a RAID level for mapped RAID according to embodiments of the present disclosure.

FIG. 3 is a flowchart illustrating a method 300 for selecting a RAID level for mapped RAID according to embodiments of the present disclosure. As shown in FIG. 3, at 302, for a given RAID level, a desired ratio of rebuilding speed between the mapped RAID and the non-mapped RAID is determined based on a number (referred to as "first number") of disks in the non-mapped RAID and a number (referred to as "a second number") of disks in the mapped RAID. For example, for the RAID 5 having four data blocks and a parity check information block ("4D+1P"), a desired rate of the rebuilding speed between the mapped RAID and the non-mapped RAID may be determined so as to ensure the reliability of the mapped RAID.

At 304, an actual ratio of the rebuilding speed between the mapped RAID and the non-mapped RAID is determined based on the number of disks in the mapped RAID. Typically, the rebuilding speed of the non-mapped RAID depends on a write bandwidth of the hot spare disk for replacement of the failed disk, while the rebuilding speed of the mapped RAID depends on the number of disks or threads participating in rebuilding the failed disk in parallel. In other words, if there are more disks participating in rebuilding the failed disk, the rebuilding speed of the mapped RAID will be faster. Therefore, if the total number of disks in the mapped RAID is greater, the rebuilding speed is increasing correspondingly.

At 306, it is determined whether the actual ratio is above the desired ratio. If the actual ratio is above the desired ratio, then the given RAID level is selected for the mapped RAID at 308. For example, the actual ratio is compared with the desired ratio, and if the actual ratio is greater than the desired ratio, it means that the reliability of the mapped RAID is higher than the reliability of the non-mapped RAID, and thus the given RAID may be selected for the mapped RAID.

In some embodiments, the method 300 may be performed respectively for each RAID level of a plurality of RAID levels, so as to determine availability of the plurality of RAID levels in the mapped RAID. In this way, the plurality of RAID levels may be selected for the mapped RAID. In some embodiments, the RAID levels may be selected from a first RAID level having one parity check information block (such as RAID 1, RAID 3, RAID 5, and so on), a second RAID level having two parity check information blocks (such as RAID 6), and a third RAID level having three parity check information blocks.

According to the method 300 of embodiments of the present application, the reliability of the mapped RAID can be effectively evaluated by comparing the desired ratio and the actual ratio of the rebuilding speed between the mapped RAID and the non-mapped RAID, such that an appropriate RAID level can be selected for the mapped RAID from the perspective of reliability.

In addition, according to the method 300 of embodiments of the present disclosure, it can be determined that the actual ratio of the mapped RAID having a plurality of parity check information blocks is higher than the desired ratio thereof, that is the reliability of the mapped RAID is higher. As a result, the RAID level having a plurality of parity check information blocks may be selected appropriately in the mapped RAID, for example the RAID level with two parity check information blocks (such as RAID) or the RAID level with three parity check information blocks, and so on.

Figure 4:
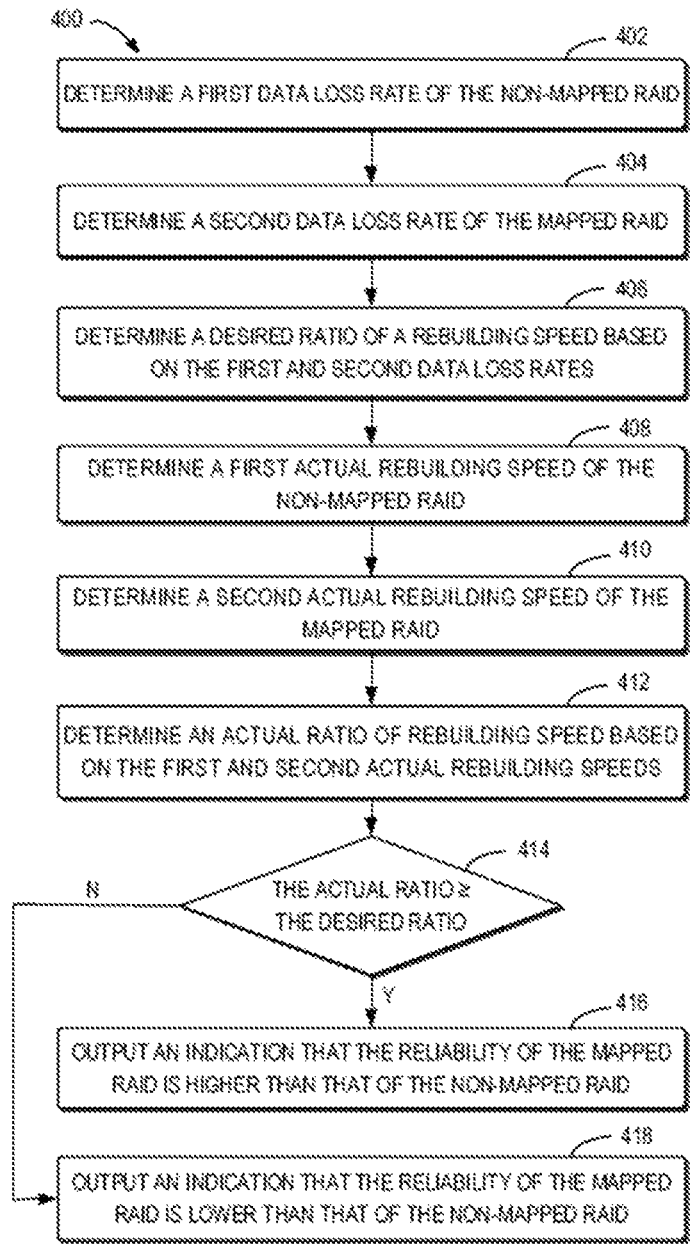
FIG. 4 illustrates a flowchart illustrating a method for determining the reliability of the mapped RAID according to embodiments of the present disclosure.

FIG. 4 is a flowchart illustrating a method 400 for determining the reliability of the mapped RAID according to embodiments of the present disclosure. It should be understood that steps 402-406 in FIG. 4 may be sub-steps of step 302 in FIG. 3, and steps 408-412 in FIG. 4 may be sub-steps of step 304 in FIG. 3, and steps 414-418 in FIG. 4 may be sub-steps of step 306 in FIG. 3. At 402, a data loss rate of the non-mapped RAID (called "a first data loss rate") is determined. The first data loss rate may be determined in various manners. For example, in some embodiments, P is assumed to be a failure possibility that one disk fails at a predetermined time point, and P(N) is assumed to be a failure possibility that one disk fails in the RAID at the predetermined time point, wherein the RAID includes N disks. Thus, the following equation (1) may be obtained:

$$P(1) = P; \quad (1)$$
$$P(2) = 2 \cdot P(1-P) = 2P - 2P^2;$$
$$P(3) = 3 \cdot P(1-P)(1-P) = 3P - 6P^2 + 3P^3;$$
$$\ldots$$
$$P(N) = N \cdot P \cdot (1-P)^{N-1}$$

Considering a mean time to failure (MTTF) of one disk may be as long as about 5 years, which means that a value of P is very small. Consequently, high order terms in the above equations may be omitted approximately, thus obtaining equation (2):

$$P(1) = P; \quad (2)$$
$$P(2) \approx 2P;$$
$$P(3) \approx 3P;$$
$$\ldots$$
$$P(N) \approx NP$$

As seen above, in the RAID having N disks, the possibility that one disk fails at a predetermined time point is proportional to the disks in the RAID, for example approximately direct proportion.

Next, the relation between the failure possibility of one disk in during predetermined period and a length of the predetermined period may be determined. For example, in one embodiment, the relation may be specified by a user. It is assumed that a change of the failure possibility of the disk with time follows a distribution function F(t) and the MTTF is about 5 years. Considering the predetermined period is usually at a magnitude of one day or several days, the distribution function curve in the predetermined period may be approximately treated as a straight line, that is $F(t) \approx p_0$. As a result, the failure possibilities of one disk within the period $T_1$ and $T_2$ may be marked as $P(T_1)$ and $P(T_2)$, both $T_1$ and $T_2$ start from the same time point S, and thus the following equation (3) may be obtained:

$$P(T_1)/P(T_2)=(p_0 \cdot T_1)/(p_0 \cdot T_2)=T_1/T_2 \quad (3)$$

Accordingly, the failure possibility of one disk within the predetermined period is proportional to the length of the predetermined period, for example approximately direct proportion.

Alternatively or in addition, in some embodiments, the relation between the failure possibility of one disk within the predetermined period and the length of the predetermined period may be determined by means of calculation. It is usually considered that the change of the failure possibility of the disk with time follows exponent distribution, and a possibility density function is assumed to be the following equation (4):

$$PDF(t)=\lambda e^{-\lambda t} \quad (4)$$

Whereby, it may be concluded that a continuous density function is to be the following equation (5):

$$CDF(t)=\int_0^t \lambda e^{-t} dt = 1 - e^{-\lambda t}, \quad (5)$$

Wherein, $\lambda$ denotes a rate parameter, and t denotes time. The failure possibility of one disk in the period T, 2T . . . nT may be obtained through the following equation (6):

$$P(T) = CDF(S+T) - CDF(S) = \quad (6)$$
$$1 - e^{-\lambda(S+T)} - (1 - e^{-\lambda S}) = e^{-\lambda S} - e^{-\lambda(S+T)}$$
$$P(2T) = CDF(S+2T) - CDF(S) =$$
$$1 - e^{-\lambda(S+2T)} - (1 - e^{-\lambda S}) = e^{-\lambda S} - e^{-\lambda(S+2T)}$$
$$P(3T) = CDF(S+3T) - CDF(S) =$$
$$1 - e^{-\lambda(S+3T)} - (1 - e^{-\lambda S}) = e^{-\lambda S} - e^{-\lambda(S+3T)}$$
$$\ldots$$
$$P(nT) = CDF(S+nT) - CDF(S) =$$
$$1 - e^{-\lambda(S+nT)} - (1 - e^{-\lambda S}) = e^{-\lambda S} - e^{-\lambda(S+nT)}$$

Then, by comparing P(T) with P(2T), P(3T) ... P(nT) respectively, and let $y=e^{-\lambda t}$, the following equation (7) may be obtained:

$$\frac{P(T)}{P(2T)} = \frac{e^{-\lambda s} - e^{-\lambda(S+T)}}{e^{-\lambda S} - e^{-\lambda(S+2T)}} = \frac{1-e^{-\lambda T}}{1-e^{-2\lambda T}} = \frac{1-y}{1-y^2} = \frac{1}{y+1}$$

$$\frac{P(T)}{P(3T)} = \frac{e^{-\lambda s} - e^{-\lambda(S+T)}}{e^{-\lambda S} - e^{-\lambda(S+3T)}} = \frac{1-e^{-\lambda T}}{1-e^{-3\lambda T}} = \frac{1-y}{1-y^3} = \frac{1}{y^2+y+1}$$

...

$$\frac{P(T)}{P(nT)} = \frac{e^{-\lambda s} - e^{-\lambda(S+T)}}{e^{-\lambda S} - e^{-\lambda(S+nT)}} = \frac{1-e^{-\lambda T}}{1-e^{-n\lambda T}} = \frac{1-y}{1-y^n} = \frac{1}{y^{n-1}+...+y+1}$$

(7)

It would be appreciated that, assume that the MTTF is for example 5 years and the time is based on art hour unit, $\lambda=1/(5\times365\times24)\approx2.28e^{-5}$, the value of $\lambda$ is relatively small, and thus $y=e^{-\lambda t}\approx1$. The following equation (8) may be obtained accordingly:

$$\frac{P(T)}{P(2T)} = \frac{1}{2}, \frac{P(T)}{P(3T)} = \frac{1}{3}, \dots, \frac{P(T)}{P(nT)} = \frac{1}{n}$$

(8)

In this way, it can also be obtained that the failure possibility of one disk in the predetermined period is proportional to the length of the predetermined time, for example approximately direct proportion.

Figure 5:
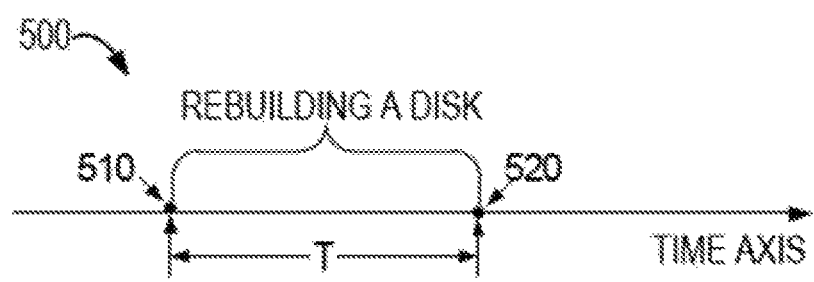
FIG. 5 is a diagram illustrating a time axis of a rebuilding process of RAID having one parity information block according to embodiments of the present disclosure.

FIG. 5 is a diagram of a time axis of a rebuilding process of RAID having one parity check information block according to embodiments of the present disclosure. As to the non-mapped RAID of the RAID level having one parity check information block (such as RAID 1, RAID 3, RAID 5, and so on), due to presence of only one redundant disk, if another disk also fails during the RAID rebuilding process, the data in the RAID will be lost. As shown in FIG. 5, at a time point 510, one disk in the RAID fails, the RAID then starts to rebuild the failed disk, and the rebuilding of the failed disk is completed at a time point 520. In other words, from the time point 510 to the time point 520, if another disk fails, data loss will occur in the RAID.

In some embodiments, according to the above equation (2), the failure possibility of disk at the time point 510 is M*P, wherein M denotes a number of disks in the non-mapped RAID, and P denotes a failure possibility of one disk at the predetermined time point. The rebuilding time of one disk in the non-mapped RAID is assumed as T, the failure possibility of each disk in the period T is assumed as P(T). According to the above equation (2), since there only remain M−1 non-failed disks, the failure possibility of another disk is (M−1)*P(T) during the period T for rebuilding the failed disk. Therefore, for the RAID level having one parity check information block, the data loss of the non-mapped RAID may be determined through the following equation (9):

$$P_{11} = M*P*(M-1)*P(T) = M*(M-1)*P*P(T)$$ (9)

Figure 6:
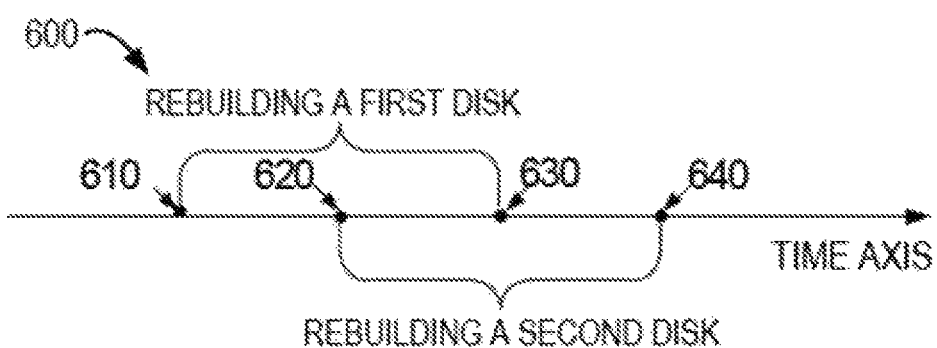
FIG. 6 is a diagram illustrating a time axis of a rebuilding process of RAID having two parity information blocks according to embodiments of the present disclosure.

FIG. 6 is a diagram illustrating a time axis of a rebuilding process of RAID having two parity check information blocks according to embodiments of the present disclosure. For the non-mapped RAID of the RAID level having two parity check information blocks (such as RAID 6), since there are only two redundant disks, the data will be lost if a third disk also fails during the process of simultaneously rebuilding two failed disks in the RAID.

As shown in FIG. 6, at a time point 610, a first disk in the RAID fails, the RAID starts to rebuild the first failed disk. At a time point 620, a second disk also fails, and the RAID starts to rebuild the second failed disk. At a time point 630, the process of rebuilding the first disk is completed, and at a time point 640, the process of rebuilding the second disk is completed. Accordingly, in the case that the two disks are in the rebuilding process, data loss will occur in the non-mapped RAID if a third disk fails. That is, from the time point 620 to the time point 630, if the third disk fails, data loss will also occur in the non-mapped RAID.

In some embodiments, according to the above equation (2), the failure possibility of one disk at the time point 610 is M*P, wherein M denotes the number of disks in the non-mapped RAID, and P denotes a failure possibility of one disk at a predetermined time point. A period for rebuilding one disk in the non-mapped RAID is assumed as T, a failure possibility of each disk in the period is assumed as P(T). Accordingly to the above equation (2), since there only remain M−1 non-failed disks, the failure possibility of the second disk is (M−1)*P(T) in the period T for rebuilding the failed disk.

Next, in the process of simultaneously building the first disk and the second disk, if the third disk fails prior to completion of rebuilding the first disk and subsequent to start of rebuilding the second disk, the data in the non-mapped RAID will be lost. Assuming that the failure possibility of disk obeys uniform distribution, a desired time point of the time point 620 is at a T/2 point after the time point 610, that is, a time length from the time point 610 to the time point 620 is T/2. Since there remain only (M−2) disks, the failure possibility of the third disk is (M−2)*P(T/2). As a result, for the RAID level having two parity check information blocks, a data loss rate of the non-mapped RAID may be determined through the following equation (10):

$$P_{12} = M*P*(M-1)*P(T)*(M-2)*P\left(\frac{T}{2}\right)$$

$$= \frac{M*(M-1)*(M-2)*P*P(T)^2}{2}$$

(10)

Figure 7:
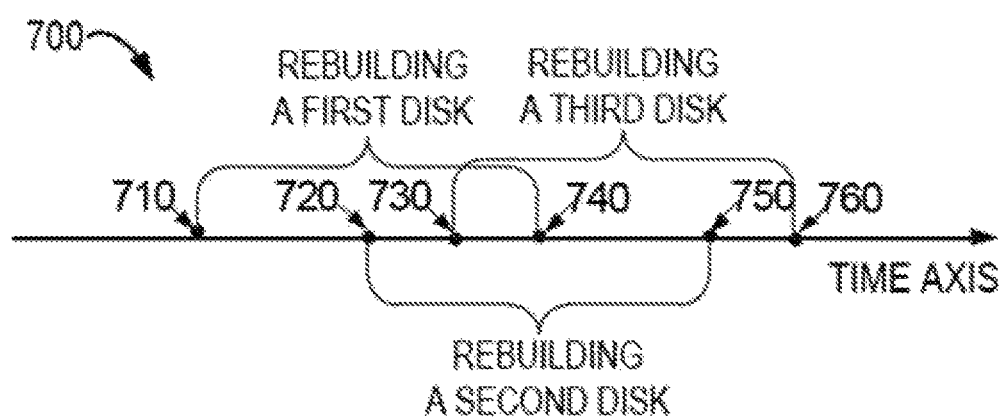
FIG. 7 is a diagram illustrating a time axis of a rebuilding process of RAID having three parity information blocks according to embodiments of the present disclosure.

FIG. 7 is a diagram illustrating a time axis of a rebuilding process of RAID having three parity check information blocks according to embodiments of the present disclosure. For the non-mapped RAID of the RAID level having three parity check information blocks, since there are only three redundant disks, the data will be lost if a fourth disk fails during the process of simultaneously rebuilding three failed disks in the RAID.

As shown in FIG. 7, at a time point 710, a first disk in the RAID fails, and the RAID then starts to rebuild the first failed disk. At a time point 720, a second disk fails, and the RAID then starts to rebuild the second failed disk. At a time point 730, a third disk fails, and the RAID then starts to rebuild the third failed, disk. The process of rebuilding the first disk is completed at a time point 740, the process of rebuilding the second disk is completed at a time point 750, and the process of rebuilding the third disk is completed at a time point 760. Therefore, in the case that the three disks are being rebuilt, data loss will occur in the non-mapped RAID if a fourth disk fails. In other words, from the time point 730 to the time point 740, data loss will occur in the non-mapped RAID if a fourth disk fails.

In some embodiments, according to the above equation (2), the failure possibility of one disk at the time point 710 is M*P, wherein M denotes a number of disks in the non-mapped RAID, and P denotes a failure possibility of one disk at the predetermined time point. The rebuilding time of one disk in the non-mapped RAID is assumed as T, the failure possibility of each disk in the period T is assumed as P(T). According to the above equation (2), since there remain only M−1 non-failed disks, the failure possibility of the second disk is (M−1)*P(T) during the period T for rebuilding the failed disk.

Next, in a process of simultaneously rebuilding the first disk and the second disk, the third disk fails prior to completion of rebuilding the first disk and subsequent to start of rebuilding the second disk. Assuming that the possibility of disk failure follows uniform distribution, a desired time point of the time point 720 is at a T/2 point after the time point 710, that is, a time length from the time point 710 to the time point 720 is T/2. Since there remain only M−2 non-failed disks, the failure possibility of the third disk is (M−2)*P(T/2).

The third disk is rebuilt in succession. If a fourth disk fails prior to completion of rebuilding the first disk and subsequent to start of rebuilding the third disk, the data in the non mapped RAID will be lost. Likewise, assuming that the possibility of disk failure follows uniform distribution, a time length between the time point 730 and the time point 740 is desired to be T/4, and since there only remain M−3 non-failed, disks, the failure possibility of the fourth disk is (M−3)*P(T/4). For the RAID level having three parity check information blocks, a data loss rate of the non-mapped RAID may be determined accordingly through the following equation (11):

$$P_{13} = M*P*(M-1)*P(T)*(M-2)*P\left(\frac{T}{2}\right)*(M-3)*P\left(\frac{T}{4}\right) \quad (11)$$
$$= \frac{M*(M-1)*(M-2)*(M-3)*P*P(T)^3}{8}$$

Still referring to FIG. 4, the method 400 proceeds to step 404, and a data loss rate of the mapped RAID (also called "a second data loss rate") is determined here. Similar to the above process of determining the data loss rate of the non-mapped RAID, data loss rates of the mapped RAID may be determined for different RAID levels. The principle and mechanism for determining a second data loss rate are similar to those for determining the first data loss rate, which are omitted herein.

It is assumed that N denotes a number of disks in the mapped RAID, P denotes a failure possibility of one disk at a predetermined time point, a period for rebuilding one disk in the mapped RAID is T', and a failure possibility of each disk in the mapped RAID is P(T'). In some embodiments, according to the above equation (3), P(T)/P(T')=T/T' may be determined.

In some embodiments, for the RAID level having one parity check information block, the data loss rate of the mapped RAID may be determined through the following equation (12):

$$P_{21} = N*P*(N-1)*P(T') = \frac{N*(N-1)*T'}{T}*P*P(T) \quad (12)$$

In some embodiments, for the RAID level having two parity check information blocks, the data loss rate of the mapped RAID may be determined through the following equation (13):

$$P_{22} = N*P*(N-1)*P(T')*(N-2)*P\left(\frac{T'}{2}\right) \quad (13)$$
$$= \frac{N*(N-1)*(N-2)*P*P(T')^2}{2}$$
$$= \frac{N*(N-1)*(N-2)*P*T'^2 P(T)^2}{2T^2}$$

In some embodiments, for the RAID level having three parity check information, the data loss of the mapped RAID may be determined through the following equation (14):

$$P_{23} = N*P*(N-1)*P(T')*(N-2)*P\left(\frac{T'}{2}\right)*(N-3)*P\left(\frac{T'}{4}\right) = \quad (14)$$
$$\frac{N*(N-1)*(N-2)*(N-3)*P*P(T')^3}{8} =$$
$$\frac{N*(N-1)*(N-2)*(N-3)*P*T'^3*P(T)^3}{8T^3}$$

Next, at 406, a desired rate $R_1$ of rebuilding speed between the mapped RAID and the non-mapped. RAID is determined based on the first data loss rate (such as $P_{11}$, $P_{12}$, $P_{13}$) and a second data loss rate (such as $P_{21}$, $P_{22}$, $P_{23}$). For example, the desired ratio $R_1$, when the first data loss rate is equal to the second data loss rate, may be determined. That is, a minimum rate of rebuilding speed between the mapped RAID and the non-mapped RAID may be determined in the case that the reliability of the mapped RAID is not lower than the reliability of the non-mapped RAID.

In some embodiments, it may be concluded, that, if $P_{11}=P_{21}$, the following equation (15) is used for a desired rate $R_{11}$ of the RAID level having one parity check information block:

$$R_{11} = \frac{T}{T'} = \frac{N*(N-1)}{M*(M-1)} \quad (15)$$

In some embodiments, it may be concluded that, if $P_{12}=P_{22}$, the following equation (16) is used for a desired rate $R_{12}$ of the RAID level having a parity check information block:

$$R_{12} = \frac{T}{T'} = \sqrt{\frac{N*(N-1)(N-2)}{M*(M-1)*(M-2)}} \quad (16)$$

In some embodiments, it may be concluded that, if $P_{13}=P_{23}$, the following equation (17) is used for a desired rate $R_{13}$ of the RAID level having a parity check information block:

$$R_{13} = \frac{T}{T'} = \sqrt[3]{\frac{N*(N-1)*(N-2)*(N-3)}{M*(M-1)*(M-2)*(M-3)}} \quad (17)$$

In some embodiments, the above equation (15)-(17) may be combined, and a desired rate R of rebuilding speed between the mapped RAID and the non-mapped RAID may be determined through an equation (18):

$$R = \left( \frac{N!/(N-(K+1))!}{M!/(M-(K+1))!} \right)^{K-1} \quad (18)$$

Wherein N denotes the number of disks in the mapped RAID, M denotes the number of disks in the non-mapped RAID, K denotes the number of parity check information blocks in the RAID level, N! denotes a factorial of N, (N−(K+1))! denotes a factorial of (N−(K+1))!, and M! denotes a factorial of M, and (M−(K+1))! denotes a factorial of (M−(K+1)).

Then, the method 400 proceeds to step 408 in which an first actual rebuilding speed of the non-mapped RAID is determined. The rebuilding speed of the non-mapped RAID is dependent on a write bandwidth of a hot spare disk for replacement of the failed disk, without being associated with the number of disks in the non-mapped RAID. Next, at 410, the second actual rebuilding speed of the mapped RAID is determined. Optionally, in some embodiments, the predicted actual rebuilding speed of the mapped RAID may be determined based on the number of disks in the mapped RAID. Alternatively, in some other embodiments, the actual rebuilding speed in the mapped RAID may be obtained from the storage system. At 412, an actual ratio of rebuilding speed between the mapped RAID and the non-mapped RAID is determined.

At 414, it is determined whether the actual ratio is greater than or equal to the desired ratio. At 416, if the actual ratio is greater than or equal to the desired ratio, an indication that the reliability of the mapped RAID is higher than that of the non-mapped RAID is output. At 418, if the actual ratio is less than the desired ratio, an indicator that the reliability of the mapped RAID is lower than that of the non-mapped RAID is output.

It would be appreciated from the above description that the method 400 of embodiments of the present disclosure can determine data loss rates of the mapped RAID and the non-mapped RAID for different RAID levels. Moreover, it can determine the reliability of the mapped RAID relative to the reliability of the non-mapped RAID at the same level by comparing the actual ratio and the desired ratio of the rebuilding speed, thereby helping select the RAID level for the mapped RAID.

In some embodiments, a condition in which the actual ratio is greater than the desired ratio may be determined, the condition may include an association relation among the RAID level, the number of disks in the mapped RAID and the number of disks in the non-mapped RAID. For example, for a particular RAID level, once the number of disks in the non-mapped RAID is determined, a range of the number of disks in the mapped RAID for ensuring reliability may be determined accordingly.

In some embodiments, for example, in a case that the rebuilding speed of the traditional RAID 5 of "4D+1P" is 35 MB/s (for example, which may be obtained from the storage system), the following Table 1 gives lower limits of the corresponding rebuilding speed desired to be reached by the mapped RAID for ensuring reliability thereof, when the traditional RAID 5 is extended to the mapped RAID by adding the number of disks (such as added from 6 to 20).

TABLE 1

Desired ratio of rebuilding speed between mapped RAID and non-mapped RAID

| Number of disks | Desired ratio | Lower limit of rebuilding speed of mapped RAID (MB/S) |
|---|---|---|
| 20 | 19.000000 | 665.00 |
| 19 | 17.100000 | 598.50 |
| 18 | 15.300000 | 535.50 |
| 17 | 13.600000 | 476.00 |
| 16 | 12.000000 | 420.00 |
| 15 | 10.500000 | 367.50 |
| 14 | 9.100000 | 318.50 |
| 13 | 7.800000 | 273.00 |
| 12 | 6.600000 | 231.00 |
| 11 | 5.500000 | 192.50 |
| 10 | 4.500000 | 157.50 |
| 9 | 3.600000 | 126.00 |
| 8 | 2.800000 | 98.00 |
| 7 | 2.100000 | 73.50 |
| 6 | 1.500000 | 52.50 |

Table 2 gives, in a case that the rebuilding speed of the traditional RAID 5 of "4D+1P" is 35 MB/s, test results of actual rebuilding speed of the mapped RAID obtained from test measurements in a certain particular configuration.

TABLE 2

Actual rebuilding speed of mapped RAID

| Rebuilding 10 threads in parallel | | Rebuilding 15 threads in parallel | |
|---|---|---|---|
| Number of disks | Rebuilding speed (MB/S) | Number of disks | Rebuilding speed (MB/S) |
| 20 | 269.4736842 | 20 | 359.1890185 |
| 19 | 253.3211291 | 19 | 338.3185392 |
| 18 | 255.0054786 | 18 | 335.0639152 |
| 17 | 258.3640309 | 17 | 289.6582937 |
| 16 | 255.3297594 | 16 | 249.9186463 |
| 15 | 245.4458293 | 15 | 267.2652294 |
| 14 | 226.7744436 | 14 | 251.728998 |
| 13 | 218.7239678 | 13 | 235.930204 |
| 12 | 215.1441298 | 12 | 239.062427 |
| 11 | 205.6720495 | 11 | 207.0276172 |
| 10 | 187.302226 | 10 | 201.4373393 |
| 9 | 175.7487342 | 9 | 194.1330367 |
| 8 | 171.9043782 | 8 | 169.0122248 |
| 7 | 156.1689797 | 7 | 156.6084483 |
| 6 | 147.786806 | 6 | 145.0808524 |

It is found that, by comparison of Table 1 with Table 2, if the number of disks in the mapped RAID is greater than 12, then the reliability of the mapped RAID in this particular configuration cannot be ensured. Thus, in order to ensure the reliability of the mapped RAID in this particular configuration is not lower than that of the corresponding traditional RAID 5, less than 12 disks may be provided in the mapped RAID group. Consequently, embodiments of the present disclosure can determine, for various RAID levels, determine an appropriate number of disks in the mapped RAID in the case of ensuring the reliability of the mapped RAID.

Figure 8:
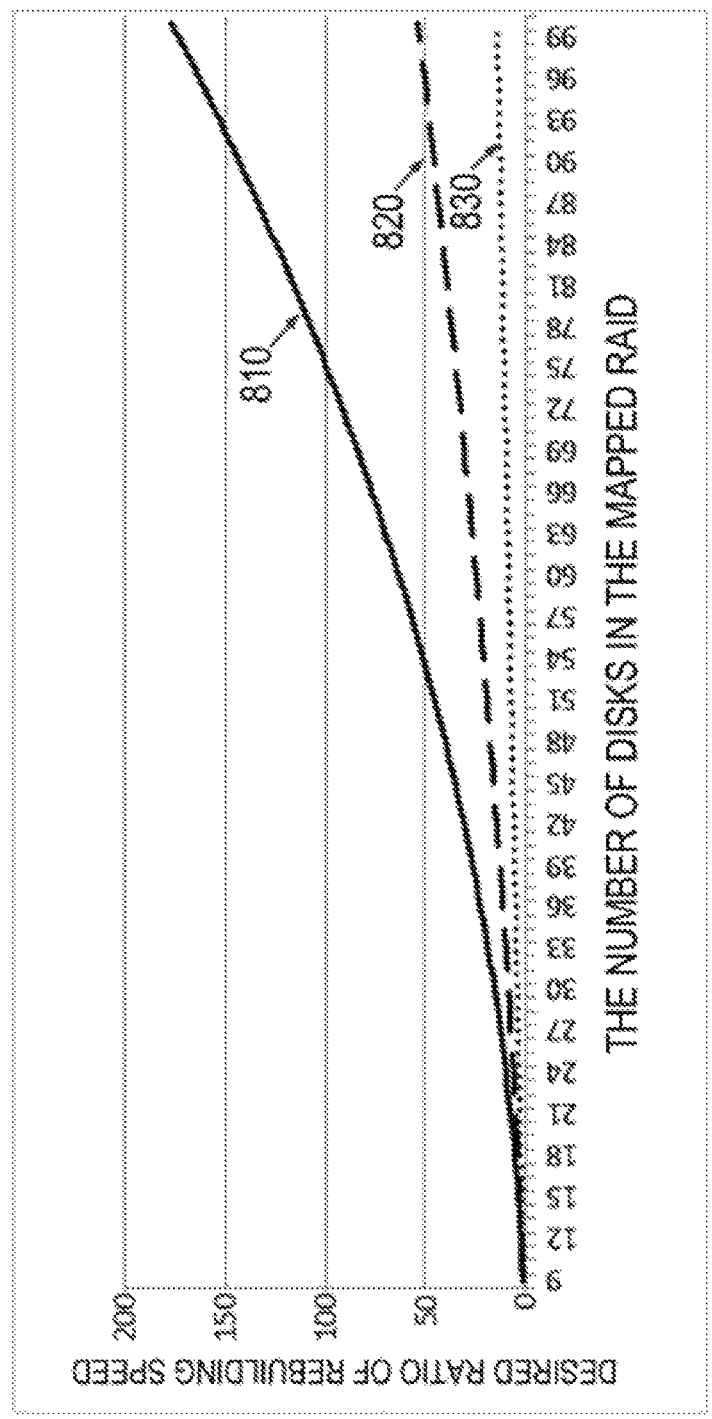
FIG. 8 is an example diagram illustrating a desired ratio of rebuilding speed between the mapped RAID and the non-mapped RAID at different RAID levels according to embodiments of the present disclosure.

FIG. 8 is an example diagram illustrating a desired ratio of rebuilding speed between mapped RAID and non-mapped RAID at different RAID levels according to embodiments of the present disclosure, in the example embodiment of FIG. 8, the non-mapped RAID includes eight disks, which respectively constitute RAID 5 of "7D+1P" having one parity check information block, RAID 6 of "6D+2P" having two parity check information blocks, and RAID level of "5D+3P" having three parity check information blocks.

The example embodiment of FIG. 8 shows, in the mapped RAID having 9-100 disks, a desired ratio of rebuilding speed of RAID at different levels, including a curve 810 of the RAID 5 of "7D+1P" having one parity check information block, a curve 820 of the RAID 6 of "6D+2P" having two parity check information blocks, and a curve 830 of the RAID level of "5D+3P" having three parity check information blocks.

As shown in FIG. 8, the RAID 5 of "7D+1P" with one parity check information block has the highest requirement on the desired ratio, and the RAID level of "5D+3P" with three parity check information blocks has the lowest requirement on the desired ratio. Accordingly, considering from the comprehensive cost performance, the RAID 6 is suitable for serving as the RAID level in the mapped RAID. Of course, if the reliability is taken into consideration without considering the cost, the RAID level having three parity check information blocks is suitable for serving as the RAID level in the mapped RAID. Consequently, embodiments of the present disclosure can select an appropriate RAID level for the mapped RAID in the case of ensuring the reliability.

Figure 9:
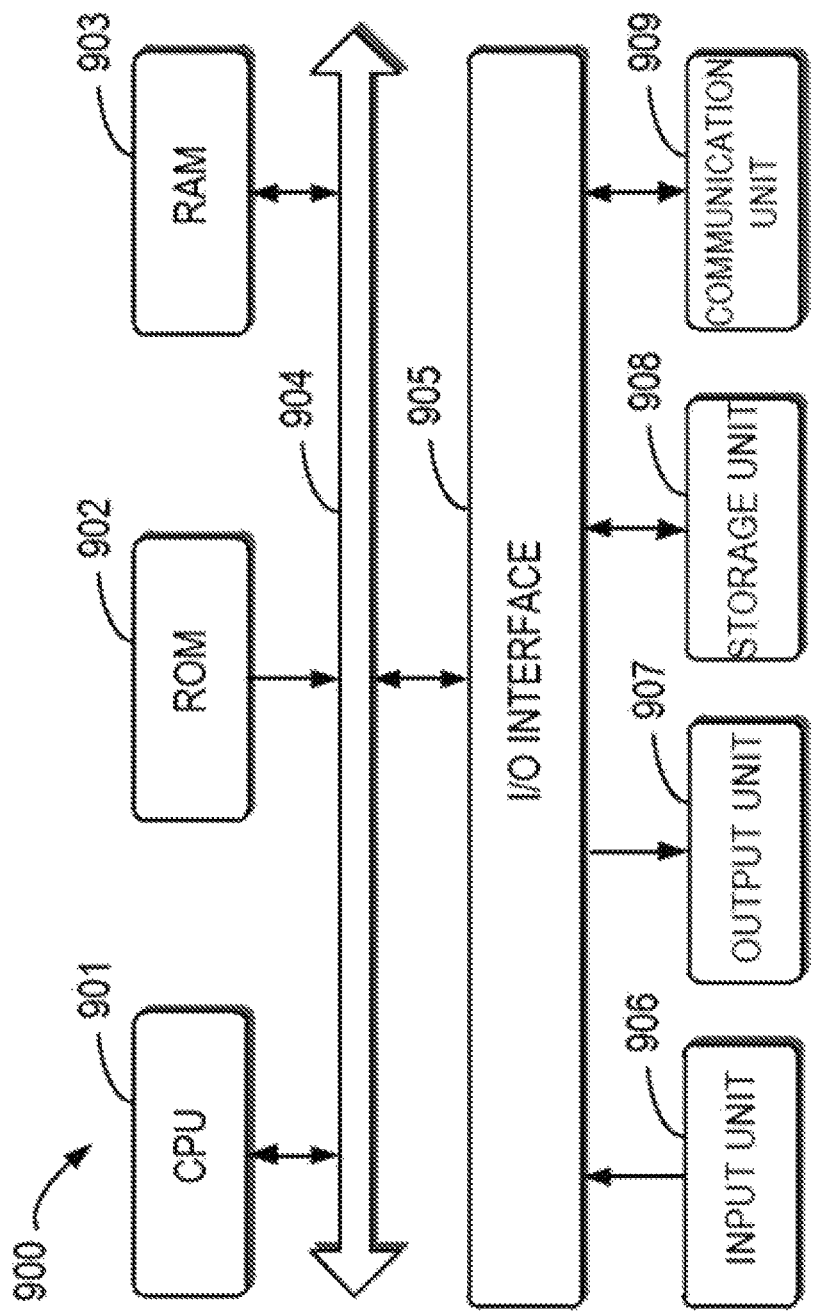
FIG. 9 is a diagram illustrating an apparatus for implementing embodiments of the present disclosure.

FIG. 9 is a block diagram illustrating an apparatus 900 for implementing embodiments of the present disclosure. As shown in FIG. 9, the apparatus 900 comprises a central processing unit (CPU) 901 that may perform various appropriate actions and processing based on computer program instructions stored in a read-only memory (ROM) 902 or computer program instructions loaded from a storage unit 908 to a random access memory (RAM) 903. In the RAM 903, there farther store various programs and data needed for operations of the apparatus 900. The CPU 901, ROM 902 and RAM 903 are connected to each other via a bus 904. An input/output (I/O) interface 905 is also connected to the bus 904.

The following components in the apparatus 900 are connected to the I/O interface 905: an input unit 906 such as a keyboard, a mouse and the like; an output unit 907 including various kinds of displays and a loudspeaker, and so on; a storage unit 908 such as a magnetic disk, an optical disk, and so on; a communication unit 909 such as a network card, a modem, and a wireless communication transceiver, and so on. The communication unit 909 allows the apparatus 900 to exchange information/data with other devices through a computer network such as the Internet and/or various kinds of telecommunications networks.

Various processes and processing described above, such as the methods 300 and 400, may be executed by the processing unit 901. For example, in some embodiments, the methods 300 and 400 may be implemented as a computer software program that is tangibly embodied on a machine readable medium, such as the storage unit 908. In some embodiments, part or all of the computer programs may be loaded and/or mounted onto the apparatus 900 via ROM 902 and/or communication unit 909. When the computer program is loaded to the RAM 903 and executed by the CPU 901, one or more steps of the method 300 or 400 as described above may be executed.

In some embodiments, the method 300 and/or 400 as described above may be implemented as a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (such as light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable those skilled in the art to understand the embodiments disclosed herein.

We claim:

1. A method for selecting a Redundant Array of Independent Disks (RAID) level for mapped RAID, the mapped RAID being configured to rebuild a failed disk using a plurality of disks, the method comprising:
   determining, for a given RAID level, a desired ratio of rebuilding speed between the mapped RAID and non-mapped RAID based on the first number of disks in the non-mapped RAID and the second number of disks in the mapped RAID;
   determining an actual ratio of rebuilding speed between the mapped RAID and the non-mapped RAID based on the second number of disks in the mapped RAID; and
   in response to the actual ratio being above the desired ratio, selecting the given RAID level for the mapped RAID.

2. The method according to claim 1, wherein the RAID level is selected from:
   a first RAID level having one parity check information block,
   a second RAID level having two parity check information blocks, and
   a third RAID level having three parity check information blocks.

3. The method according to claim 2, wherein the determining a desired ratio of rebuilding speed between the mapped RAID and the non-mapped RAID comprises:
   determining the desired ratio R of rebuilding speed between the mapped RAID and the non-mapped RAID as:

$$R = \left( \frac{N!/(N-(K+1))!}{M!/(M-(K+1))!} \right)^{K-1}$$

wherein N denotes the second number of disks in the mapped RAID, M denotes the first number of disks in the non-mapped RAID, K denotes the number of parity check information blocks associated with the given RAID level, and "!" denotes a factorial operation.

4. The method according to claim 1, wherein the determining an actual ratio of rebuilding speed between the mapped RAID and the non-mapped RAID comprises:
   determining an actual rebuilding speed of the mapped RAID based on the second number of disks in the mapped RAID; and
   determining the actual ratio of rebuilding speed between the mapped RAID and the non-mapped RAID based on the actual rebuilding speed of the mapped RAID and an actual rebuilding speed of the non-mapped RAID.

5. The method according to claim 1, wherein the determining a desired ratio of rebuilding speed between the mapped RAID and the non-mapped RAID comprises:
   determining a first data loss rate of the non-mapped RAID and a second data loss rate of the mapped RAID based at least partly on the number of parity check information blocks associated with the given RAID level.

6. The method according to claim 5, wherein the determining a desired ratio of rebuilding speed between the mapped RAID and the non-mapped RAID further comprises:
   determining the first data loss rate of the non-mapped RAID based further on the first number of disks in the non-mapped RAID, a failure possibility of each disk in the non-mapped RAID at a predetermined time point, and a failure possibility of each disk in the non-mapped RAID during a rebuilding period; and
   determining the second data loss rate of the mapped RAID based further on the second number of disks in the mapped RAID, a failure possibility of each disk in the mapped RAID at a predetermined time point, and a failure possibility of each disk in the mapped RAID during a rebuilding period.

7. The method according to claim 6, wherein the determining a desired ratio of rebuilding speed between the mapped RAID and the non-mapped RAID further comprises:

determining the desired ratio of rebuilding speed between the mapped RAID and the non-mapped RAID based on the first and second data loss rates.

8. An electronic device, comprising:
a memory; and
a processing unit coupled to the memory and configured to:
determine, for a given Redundant Array of Independent Disks (RAID) level, a desired ratio of rebuilding speed between mapped RAID and non-mapped RAID based on the first number of disks in the non-mapped RAID and the second number of disks in the mapped RAID, the mapped RAID being configured to rebuild a failed disk using a plurality of disks;
determine an actual ratio of rebuilding speed between the mapped RAID and the non-mapped RAID based on the second number of disks in the mapped RAID; and
in response to the actual ratio being above the desired ratio, select the given RAID level for the mapped RAID.

9. The electronic device according to claim 8, wherein the RAID level is selected from:
a first RAID level having one parity check information block,
a second RAID level having two parity check information blocks, and
a third RAID level having three parity check information blocks.

10. The electronic device according to claim 9, wherein the determining a desired ratio of rebuilding speed between the mapped RAID and the non-mapped RAID comprises:
determining the desired ratio R of rebuilding speed between the mapped RAID and the non-mapped RAID as:

$$R = \left( \frac{N!/(N-(K+1))!}{M!/(M-(K+1))!} \right)^{K-1}$$

wherein N denotes the second number of disks in the mapped RAID, M denotes the first number of disks in the non-mapped RAID, K denotes the number of parity check information blocks associated with the given RAID level, and "!" denotes a factorial operation.

11. The electronic device according to claim 8, wherein the determining an actual ratio of rebuilding speed between the mapped RAID and the non-mapped RAID comprises:
determining an actual rebuilding speed of the mapped RAID based on the second number of disks in the mapped RAID; and
determining the actual ratio of rebuilding speed between the mapped RAID and the non-mapped RAID based on the actual rebuilding speed of the mapped RAID and an actual rebuilding speed of the non-mapped RAID.

12. The electronic device according to claim 8 wherein the determining a desired ratio of rebuilding speed between the mapped RAID and the non-mapped RAID comprises:
determining a first data loss rate of the non-mapped RAID and a second data loss rate of the mapped RAID based at least partly on the number of parity check information blocks associated with the given RAID level.

13. The electronic device according to claim 12, wherein the determining a desired ratio of rebuilding speed between the mapped RAID and the non-mapped RAID further comprises:
determining the first data loss rate of the non-mapped RAID based further on the first number of disks in the non-mapped RAID, a failure possibility of each disk in the non-mapped RAID at a predetermined time point, and a failure possibility of each disk in the non-mapped RAID during a rebuilding period; and
determining the second data loss rate of the mapped RAID based further on the second number of disks in the mapped RAID, a failure possibility of each disk in the mapped RAID at a predetermined time point, and a failure possibility of each disk in the mapped RAID during a rebuilding period.

14. The electronic device according to claim 13, wherein determining a desired ratio of rebuilding speed between the mapped RAID and the non-mapped RAID further comprises:
determining the desired ratio of rebuilding speed between the mapped RAID and the non-mapped RAID based on the first and second data loss rates.

15. A computer program product for selecting a Redundant Array of Independent Disks (RAID) level for mapped RAID, the mapped RAID being configured to rebuild a failed disk using a plurality of disks, the computer program product comprising:
a non-transitory computer readable medium encoded with computer-executable code, the code configured to enable the execution of:
determining, for a given RAID level, a desired ratio of rebuilding speed between the mapped RAID and non-mapped RAID based on the first number of disks in the non mapped RAID and the second number of disks in the mapped RAID;
determining an actual ratio of rebuilding speed between the mapped RAID and the non-mapped RAID based on the second number of disks in the mapped RAID; and
in response to the actual ratio being above the desired ratio, selecting the given RAID level for the mapped RAID.

* * * * *